though with certain modifications as hereinafter described.

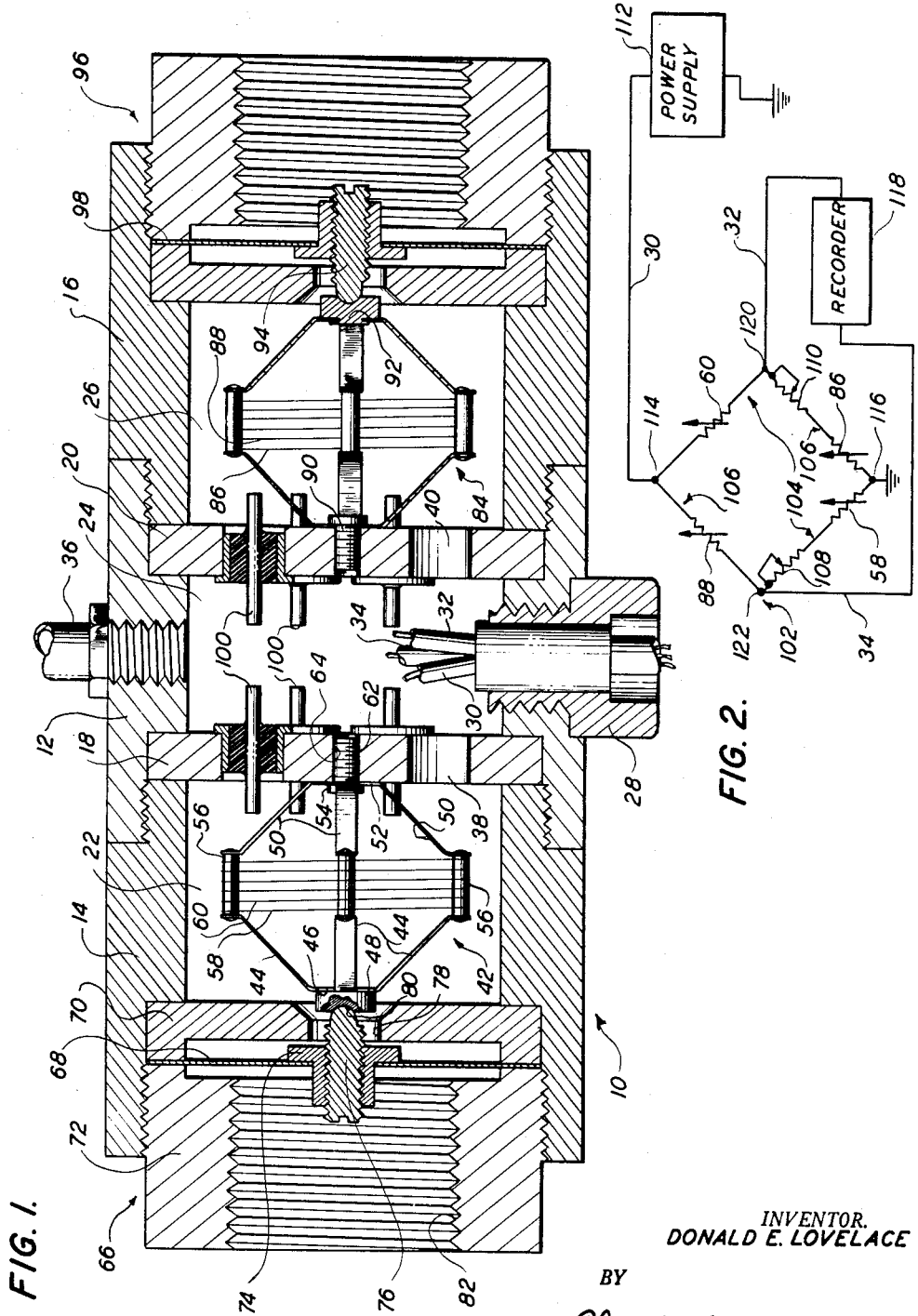

United States Patent Office 2,872,813
Patented Feb. 10, 1959

2,872,813

SYMMETRICAL TRANSDUCER

Donald E. Lovelace, Arcadia, Calif., assignor, by mesne assignments, to Consolidated Electrodynamics Corporation, Pasadena, Calif., a corporation of California Application July 14, 1955, Serial No. 522,080

1 Claim. (Cl. 73—398)

This invention relates to electro-mechanical transducers for providing electrical representations of small differential motions, different pressures and the like. The invention has particular reference to housing arrangements for differential transducer apparatus employing strain-sensitive electrical resistance wires and means for varying the mechanical strain in the wires in accordance with said differential motions, pressures and the like.

In the strain-sensitive wire type differential transducer, a serious problem arises with regard to the spurious effect of variations in temperature, humidity, excitation voltage and other external factors on the output of the transducer. Conventionally, a lower response to such environmental and operational conditions is obtained by mechanically coupling two pairs of strain-sensitive electrical resistance wires under tension to a movable member and to fixed points in opposite manners. Thus, when the member is moved such as in response to the difference between a pressure variation at two locations, one pair of strain-sensitive wires increase in tension and the other pair of strain-sensitive wires simultaneously decrease in tension.

Although the conventional differential transducer structure tends to lower the effect of environmental conditions, the transducer is inherently limited in its maximum operative range by the pre-set tension in the pairs of strain-sensitive wires. The limitation is inherent because the tension increase and relaxation in the pairs of strain-sensitive wires occurs simultaneously and interdependently, requiring that the instrument be zero balanced at mechanical mid-scale and thus allowing only half of the useable deflection in either direction.

The apparatus of the present invention, by incorporating a true mechanical symmetry and a pair of independent sensing elements, eliminates the spurious effects of environmental conditions and further permits utilization of the total linear elastic range of the strain-sensitive wires. The apparatus comprises a pair of independent sensing elements each having a pair of strain-sensitive wires responsive to deformation of the sensing element. A housing encloses and connects to both sensing element so that they are subjected to substantially the same environmental conditions, and means are provided for varying the tension in the respective pairs of strain-sensitive wires in accordance with physical phenomena to be measured so that the two pairs of strain-sensitive wires may be utilized to control an electrical signal in representation of the physical phenomena. The housing has three compartments, two end compartments and a central compartment. The sensing elements are disposed in the respective end compartments and all electrical inter-connections between the sensing elements and all external electrical connections and openings are made in and from the central compartment.

Preferably, the respective pairs of strain-sensitive wires are electrically connected so that each pair of wires forms a schematically opposite pair of arms of a four-arm electrical bridge.

Since each sensing element supplies reference bridge arms for the other, either sensing element can act independently as a two-active-arm bridge device, or simultaneous mechanical inputs can be differentially added or subtracted.

Electrical and mechanical symmetry is provided so that spurious outputs produced by environmental conditions acting on one sensing element are cancelled by an equal and opposite effect on the other sensing element. Since the two sensing elements act independently, each may be treated as a separate transducer and either may be taken to full scale deflection resulting in a substantially higher output than is achieved by conventional apparatus.

The invention is explained in detail with reference to a preferred embodiment shown in the drawings, in which:

Fig. 1 is an elevation in partial section of the preferred embodiment of the invention; and Fig. 2 is a schematic drawing showing the four-active-arm electrical bridge circuitry of the apparatus of Fig. 1.

Referring to Fig. 1, the preferred embodiment of the invention includes a substantially cylindrical case 10, the case being composed of a substantially cylindrical center section 12 internally threaded at each end, first and second substantially cylindrical end sections 14, 16 each having external threads at one end. The end sections are screwed into the respective ends of the center section. A first circular base plate 18 is fixed across the interior of the case between the center section and the first end section, and a second circular base plate 20 is fixed across the interior of the case between the center section and the second end section. The case is substantially hollow and open at both ends, with the base plates dividing the case generally into a first end compartment 22, a central compartment 24 and a second end compartment 26.

The case center section is provided with plug means 28 which extends through the wall of the center section for accommodating terminal wires 30, 32, 34 and with a pressure fitting or conduit means 36 which also extends through the wall of the center section so that a reference pressure may be maintained inside the case. The reference pressure may be atmospheric or any other desired pressure, and first and second base plates have openings 38, 40 respectively for communicating the reference pressure between the three compartments of the case. This allows the measurement of differential pressures with respect to a third reference pressure, which feature is unique to this instrument.

A first sensing element 42 is disposed in the first end compartment. The sensing element 42 includes a first plurality of equal annularly spaced depending flexible legs 44 formed integrally about an annular hub 46 with a first end member 48 centrally connected through the annular hub. The sensing element 42 further includes a second plurality of equal annularly spaced depending flexible legs 50 formed integrally about a second annular hub 52 with a second end member 54 centrally connected through the annular hub. The first and second plurality of legs face toward each other, and a corresponding plurality of posts 56 are inter-connected between the ends of corresponding legs, thus forming a cage-like structure which expands when compressed.

A first strain sensitive electrical resistance wire 58 and a second strain-sensitive electrical resistance wire 60 are wound about the periphery of the cage structure as formed by the plurality of posts. The pair of wires 58, 60 are wound under a tension which corresponds to the mid-point of their linear elastic range. This first sensing element is substantially the same as that disclosed by Joseph Lancor et al. in U. S. Patent No. 2,636,964 issued April 28, 1953.

The first sensing element is rigidly connected to the outer face of the first base plate by means of the second end member 54 whose end is threaded as shown at 62 for engaging the threads of a centrally located threaded bore 64 of the first base plate. The opposite end of the first sensing element may then be moved back and forth to vary the tension in the pair of wires 58, 60 and thus vary the electrical resistance of the wires accordingly.

A first diaphragm assembly 66 closes off the end of the case that opens into the compartment 22. The diaphragm assembly includes a circular diaphragm member 68 held across the end of the case by a first diaphragm support plate 70 and an inlet adaptor 72. A diaphragm bushing 74 is connected centrally through the diaphragm, and an adjustment screw 76 screws through the diaphragm bushing and extends through a central opening 78 in the diaphragm support plate to make contact with the first end member of the first sensing element. The adjustment screw has a rounded forward end which fits into a rounded recess 80 formed in the face of the first end member. The pre-set tension in the pair of wires wound on the first sensing element acts to force the free end of the sensing element against the rounded end of the adjustment screw. Thus, the first sensing element is axially supported and any movement of the diaphragm 68 will vary the tension in the strain-sensitive wires 58, 60. The inlet adaptor 72 has a threaded bore 82 extending axially through it for receiving a pressure inlet line (not shown), the far end of the pressure inlet line being disposed at a first location for permitting pressure at this location to act upon the diaphragm 68.

A second sensing element 84 is disposed in the second end chamber 26 of the case, with one end of the sensing element fixed centrally to the second base plate 20 and with the free end of the sensing element facing toward the end of the case opening into the second end chamber. The second sensing element is identical to the first sensing element both electrically and mechanically, and includes a first strain-sensitive electrical resistance wire 86 and a second strain-sensitive electrical resistance wire 88 wound under tension around its periphery. The second sensing element is connected to the second base plate by means of its second end member 90, and its free end represented by its first end member 92 contacts the adjustment screw 94 of a second diaphragm assembly 96. The second diaphragm assembly is identical to the first diaphragm assembly and includes a diaphragm member 98 which deflects in response to pressure admitted by a second pressure inlet line (not shown) having its far end disposed at a second location, the term "second location" being used to distinguish from the first location at which the far end of the first pressure inlet line is disposed.

The respective ends of the four strain-sensitive wires are connected by way of a plurality of electrical feedthroughs 100 which extend through the respective base plates into the central compartment 24. The electrical inter-connection is made in the central compartment and is shown schematically in Fig. 2 with the schematic representations of corresponding parts of the apparatus of Fig. 1 utilizing the same reference numerals as applied in Fig. 1.

As shown in Fig. 2, a four-active-arm electrical bridge 102 having a first pair of schematically opposite arms 104 and a second pair of schematically opposite arms 106 forms the operational circuit of the transducer. The pair of strain-sensitive wires 58, 60 wound on the first sensing element of Fig. 1 are connected respectively in the circuits of the first pair of opposite arms 104 of the electrical bridge, the wires being represented as variable resistors correspondingly designated as 58 and 60. Likewise the pair of strain-sensitive wires 86, 88 wound on the second sensing element of Fig. 1 are connected in the circuits of the second pair of schematically opposite arms 106 of the bridge respectively, the wires being schematically represented by variable resistors designated at 86, 88 respectively. A pair of small adjustable resistors 108, 110 are connected in the circuits of schematically adjacent arms 104, 106 respectively and provide a fine adjustment for balancing the electrical bridge.

A power supply 112 is electrically connected across a pair of input terminals 114, 116 disposed between first opposite pairs of schematically adjacent arms of the bridge respectively, one connection being made by the terminal wire 30 and the other connection being made by way of ground. A recorder 118 is connected by terminal wires 32, 34 across a pair of output terminals 120, 122, the output terminals being connected between second opposite pairs of schematically adjacent arms of the bridge.

When the bridge is balanced, the electrical potential at each of the output terminals 120, 122 will be the same and no signal will pass through the recorder. However, variations in the resistance of the strain-sensitive wires produced by diaphragm deflections will unbalance the bridge in one direction or the other and cause an electrical signal to pass through the recorder which is representative of the algebraic summation of the forces acting on the two diaphragms 68, 98.

The electrical bridge of Fig. 2 cannot be classified as a conventional four-active-arm bridge because mechanical deformations of strain-sensitive wires of adjacent arms are not necessary in opposite directions, nor are they necessarily simultaneous. Yet, inactive windings are dispensed with since each sensing element supplies reference bridge arms for the other.

In the preferred embodiment, the transducer of the invention is particularly useful in flight testing and especially for measuring dynamic pressure differentials across airfoil sections. Both inlet adaptors should be provided with identical pressure inlet lines so that they will have the same frequency characteristics and allow dynamic pressures to be measured in their proper phase relationship.

Although the preferred embodiment of the invention is described with reference to the measurement of the difference between a pressure variation at two locations, the apparatus is easily converted into a high-output accelerometer or a dynamometer-micrometer for comparison of linear differential forces or motions by providing suitable substitutes for the diaphragm assemblies.

I claim:

In a differential pressure transducer including two diaphragms which deflect with pressure and two sensing elements each having a pair of strain-sensitive wires and responsive to the deflection of the respective diaphragms for changing the electrical characteristics of the wires in accordance with pressure variations, the improvement which comprises a substantially hollow housing, means positioning the respective diaphragms across opposite ends of the housing, a pair of spaced interior walls dividing the interior of the housing into three main compartments, two end compartments and a central compartment, each interior wall having an opening through it so that the three compartments communicate with each other, the two sensing elements being respectively mounted in the two end compartments, a plurality of insulated electrical feedthroughs extending through said interior walls and electrically connected to the strain sensitive wires of the sensing elements for permitting electrical access to said wires from the central compartment, means electrically interconnecting said electrical feedthroughs in the central compartment so that the respective strain sensitive wires are arranged in the respective arms of a four-arm electrical bridge, electrical terminal means sealed through the exterior wall of the central compartment of the housing and connected to said feedthroughs for making exterior electrical connections to a power supply and to a recorder for the four-arm electrical bridge, and a pressure fitting extending through the exterior wall of the central compartment of the housing so that a reference pressure can be supplied to the interior of the housing by way of the central compartment.

References Cited in the file of this patent

UNITED STATES PATENTS

| | | |
|---|---|---|
| 1,718,494 | Schurig | June 25, 1929 |
| 2,455,883 | Statham | Dec. 7, 1948 |
| 2,593,169 | Moore | Apr. 15, 1952 |
| 2,636,964 | Lancor | Apr. 28, 1953 |
| 2,680,376 | Shaw | June 8, 1954 |